United States Patent [19]
Kennedy et al.

[11] Patent Number: 5,302,985
[45] Date of Patent: Apr. 12, 1994

[54] OVERHEAD PROJECTOR FOR LCD PANEL

[75] Inventors: James K. Kennedy, Round Rock; Michael Sweaton, Austin; Gary L. Tritle, Lakeway, all of Tex.

[73] Assignee: Minnesota Mining and Manufacturing Company, St. Paul, Minn.

[21] Appl. No.: 25,266

[22] Filed: Mar. 2, 1993

Related U.S. Application Data

[63] Continuation-in-part of Ser. No. 861,284, Mar. 31, 1992, Pat. No. 5,231,434.

[51] Int. Cl.$^5$ .............................................. G03B 21/00
[52] U.S. Cl. ............................. 353/122; 353/DIG. 3; 353/119
[58] Field of Search ......... 353/122, 121, 120, DIG. 3, 353/DIG. 5, 119

[56] References Cited

U.S. PATENT DOCUMENTS

| | | | |
|---|---|---|---|
| 4,880,303 | 11/1989 | Grunwald | 353/DIG. 3 |
| 4,882,599 | 11/1989 | Grunwald | 353/DIG. 5 |
| 4,944,578 | 7/1990 | Denison | 353/DIG. 5 |
| 4,953,971 | 9/1990 | Highfill | 353/DIG. 5 |
| 5,016,984 | 5/1991 | Fergason | 353/122 |
| 5,120,125 | 6/1992 | Behr | 353/102 |
| 5,159,363 | 10/1992 | Brauning | 353/122 |
| 5,187,510 | 2/1993 | Vogeley et al. | 353/DIG. 3 |

Primary Examiner—William A. Cuchlinski, Jr.
Assistant Examiner—William C. Dowling
Attorney, Agent, or Firm—Gary L. Griswold; Walter N. Kirn; Jack V. Musgrove

[57] ABSTRACT

An overhead projector (OHP) presentation system uses a liquid crystal display (LCD) panel to project electronically stored graphic images. The OHP preferably includes an integrated computer having a plurality of output ports for connection to various peripheral devices. A novel interface card is also used to provide electrical connections between the computer and the LCD panel, providing the further benefit of aligning the transmissive portion of the panel with the stage of the OHP. The LCD panel may be designed to swing horizontally into the optical path. This may be accomplished by providing a sliding drawer which inserts the panel within the body of the OHP, or by pivotally attaching the panel to the stage of the OHP.

19 Claims, 5 Drawing Sheets

OVERHEAD PROJECTOR FOR LCD PANEL

CROSS-REFERENCE TO RELATED APPLICATION

This application is a continuation-in-part of U.S. Pat. Application Ser. No. 07/861,284 filed Mar. 31, 1992 and now U.S. Pat. No. 5,231,434.

BACKGROUND OF THE INVENTION

1. Field of the Invention

The present invention generally relates to projection and display systems, and more particularly to an overhead projector having a computer integrated therein with several output ports for external devices, and having a unique interface card which electronically connects the overhead projector to a liquid crystal display panel and simultaneously aligns the panel with the stage of the overhead projector. The panel may be slidably or pivotally attached to the overhead projector.

2. Description of the Prior Art

Overhead projectors (OHP's) are known in the art, and generally consist of a base having a stage area, a light source to illuminate the stage, and a projector head which houses mirrors and lenses designed to project any image placed on the stage area onto a display screen. OHP's may be either transmissive or reflective. In a transmissive OHP, the light source is under the stage area, i.e., opposite the side of the projector head. In a reflective OHP, the light source is above the stage area, typically near or even in the projector head, and the stage has a mirror-like surface to reflect the light back toward the head.

Use of OHP's has recently expanded from the traditional projection of images printed on transparent films, to the projection of images which are stored in machine-readable form (e.g., on magnetic or optical disks) and which are presented by means of a light-transmissive liquid crystal display (LCD) panel which is laid on the stage of the OHP. Exemplary LCD/OHP arrangements are shown in U.S. Pat. Nos. 4,846,694 and 4,944,578. In these patents, the LCD panels are controlled by external processors, such as a personal computer (PC). This type of system enhances the use of an OHP since the LCD controller may simultaneously direct the video output to other viewing devices, such as television monitors, which may be placed at several stations among the audience.

Several problems have arisen, however, in the use of LCD panels with OHP's. Foremost among these is the difficulty of storing and transporting the PC which controls the LCD panel, and connecting the PC to the panel. Three alternative systems have been devised to overcome this problem. The first system simply provides a portable "black box," much more compact than a normal PC and having simplified user inputs, which contains the minimum electronic components necessary to control the LCD panel, such as a microprocessor, memory storage and a monitor output port. An example of such a system is VIDEOSHOW (a trademark of General Parametrics Corp. of Berkeley, Calif.), wherein the graphic images are prepared at a normal PC, and then transferred to a magnetic (floppy) diskette which may be placed in the portable unit. The second system similarly incorporates certain components into the LCD panel, instead of the OHP. An example of an LCD panel having a microprocessor and memory means for storing images is disclosed in European Patent Application No. 89114916.3.

A third system for simplifying the LCD/OHP combination integrates certain computer components within the OHP. An example of this type of system is found in U.S. Pat. No. 4,882,599. This design, however, suffers from the drawback of the processor being limited to the single purpose of controlling the LCD panel. In other words, it is impossible to adapt the integrated OHP-computer for other uses such as remote communications, printing, etc. More generally, these functions are unavailable due to the lack of any external ports for connection of peripherals, such as a modem, printer, mouse, etc. Another disadvantage is that these systems do not support direct digital drive (for VGA-compatible panels), so that video signals must be converted from digital to analog and then back to digital again to interface to the LCD. Also, prior art OHP-computers are not compatible with conventional PC operating systems, such as PC-DOS, OS/2 (trademarks of International Business Machines), MS-DOS (a trademark of Microsoft Corp.), DR DOS (a trademark of Digital Research, Inc.), or MACINTOSH system (a trademark of Apple Computers, Inc.), additionally limiting their usefulness.

A further inconvenience of using an LCD panel with an OHP relates to the physical attachment of the panel to the OHP, and the electrical connections between the panel, its controller, and the OHP. Those skilled in the art will appreciate the importance of properly aligning the LCD panel with the stage of the overhead projector. Misalignment can result in lower light transmission through the panel, leading to an inferior projected image, and heat management problems; this is particularly critical in stacked panel designs which are subject to parallax problems, and also when special optical components, such as fresnel lenses, are used with the OHP. While it is not terribly difficult to properly align a portable LCD panel on an OHP, the fumbling that often occurs in this step adversely detracts from the presentation, and this problem can be amplified depending upon the particular dimensions of the LCD panel and OHP being used. With respect to the problem of electrical interconnection, anyone who has made a presentation with an LCD/OHP system has experienced the confusion of trying to connect the various cables needed for power, video, LCD control and other accessories. This confusion leads not only to delays, but also presents a possible hazard of electrical shock to a user or damage to the equipment if the cabling is not properly connected. Additionally, the user must insure that the proper cables (i.e., terminal connectors) are provided for the particular computer/LCD ports being used.

The problems mentioned in the foregoing paragraph are avoided in systems wherein the LCD panel is permanently integrated with the OHP. See, e.g., U.S. Pat. Nos. 4,763,993 (FIG. 4b) and 4,880,303. The first of these devices, however, is less desirable since the LCD panel always remains in the optical projection path, even when a transparency, rather than the LCD panel, is being used to provide the image. This in turn results in lower light transmission (due to the use of polarizers in the LCD panel) and hence poorer contrast in the projected image. In the second of these devices, although the LCD panel can be hinged upwardly out of the optical projection path, its attachment to the OHP still leads to storage and transportation problems and, in both devices, the LCD panel is not removable and so cannot be used with other systems. The latter aspect of these devices can be considerably frustrating, e.g., when the LCD panel is properly functioning but the OHP is nonfunctional, which may have many causes including breakdown of electrical components/connections in the OHP, or breakage of optical components such as the lamp or lenses. Another disadvantage of the last two mentioned patents is that, when the LCD panel is moved to its upper position out of the optical projection path, it presents an obstruction which may prevent certain viewers in the audience from being able to see the projected image. The simplest solution to this problem is to make the LCD panel completely removable, but this solution leads back to the aforementioned problems of panel storage and cable interconnection. It would, therefore, be desirable and advantageous to devise an LCD/OHP system which would overcome all of the above limitations, particularly one which is easily adapted for use with either transparencies or an LCD panel, which provides means for conveniently storing the panel in a position which does not obstruct the projection screen from any viewing angle and further provides means for conveniently connecting the panel to the computer or controller.

SUMMARY OF THE INVENTION

The foregoing objective is achieved in a presentation system having an overhead projector specially designed to interface with a liquid crystal display panel. The OHP has an internal computer which is preferably compatible with conventional operating systems for personal computers, and has a plurality of output ports for connection to external accessories. The upper surface of the OHP base has a slot therein, proximate the stage area, for receiving an interface card which electronically connects the LCD panel to the internal computer. Thus, there is no need for any cabling in the system, other than the primary power cord exiting from the OHP base. Power is supplied from this cord to the OHP and computer, and to the LCD panel via the interface card. Use of an interface card to so provide the electrical connections also imparts the unexpected advantage of providing accurate alignment of the LCD panel with the OHP stage.

The LCD panel may further be pivotally or slidably attached to the OHP. In the pivoting embodiment, one corner of the panel includes a post which is removable engaged in a hole in the OHP stage, and the slot for receiving the card connector extends completely through the panel to allow downward insertion of the card through the slot, and into the OHP. In the sliding embodiment, the panel rests in or comprises a drawer which slides out of either side of the OHP base, and mechanical means may optionally be provided to actuate an auxiliary lens within the OHP body which reshapes the light beam based on the size and location of the panel window. In both embodiments, when the LCD panel is not in use, it acts as a shelf to support other articles, e.g., transparencies.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
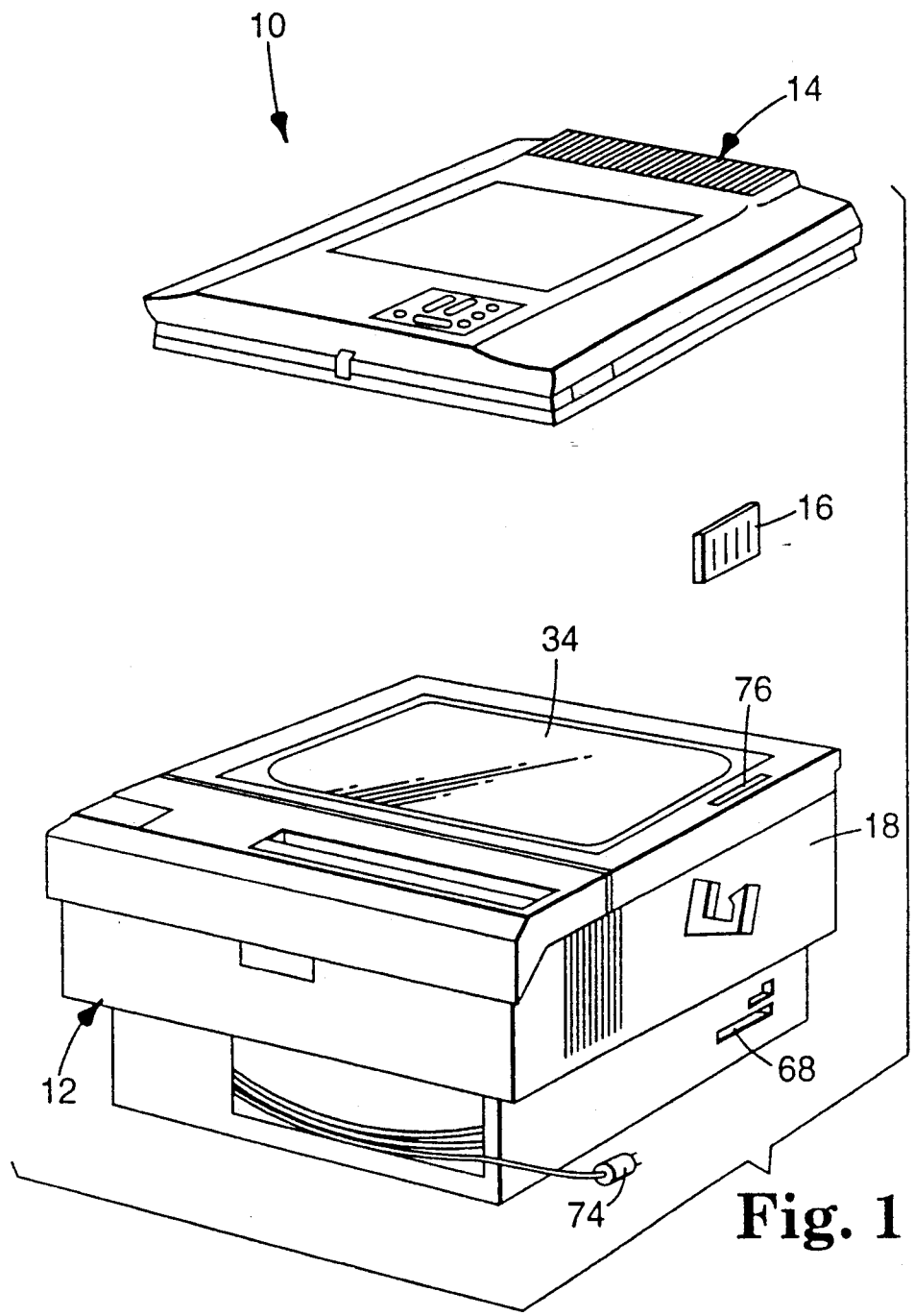
FIG. 1 is a perspective view of the OHP/LCD system of the present invention, showing the interconnection between the OHP and the LCD panel by means of the interface card.
Figure 2:
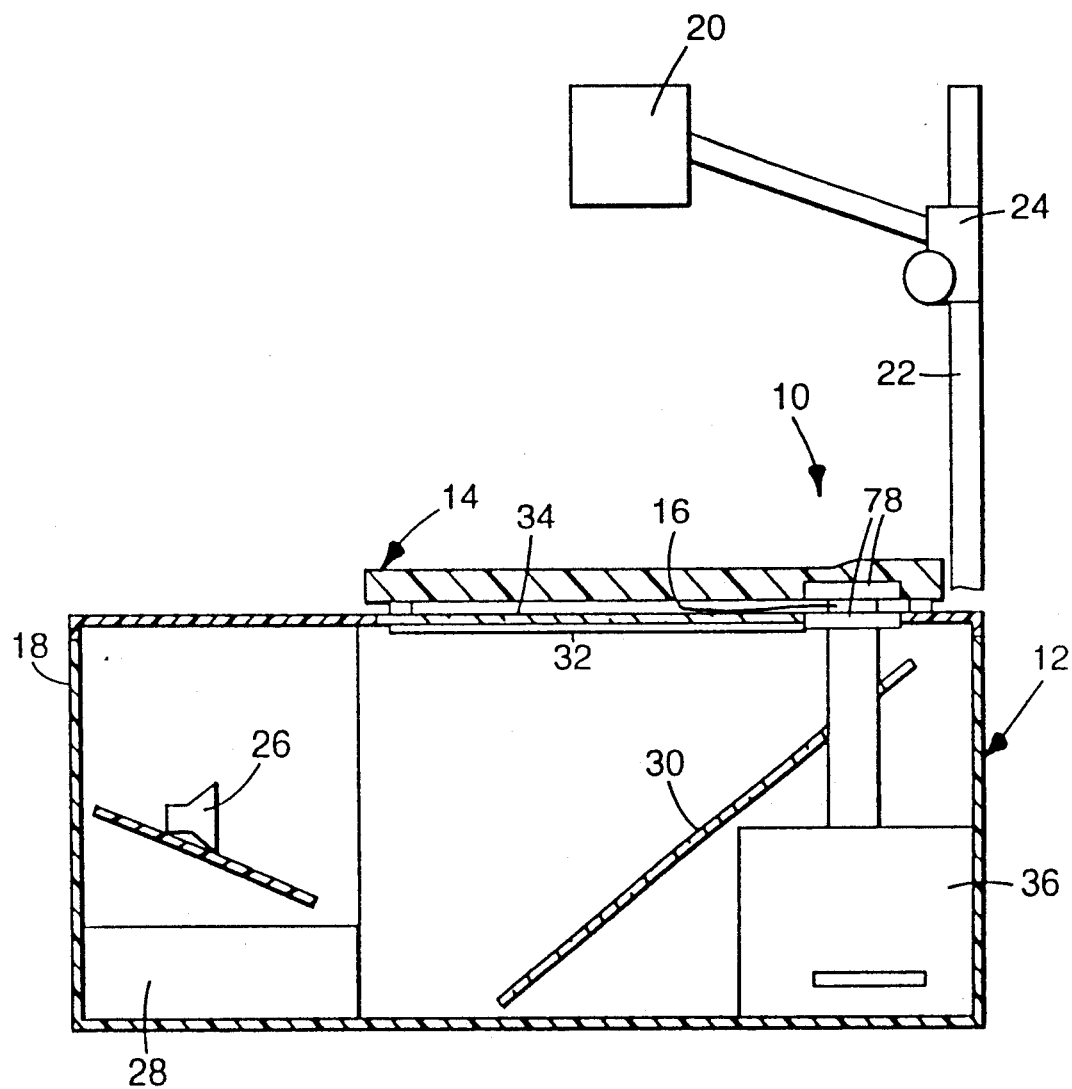
FIG. 2 is an elevational cross-section of the OHP base illustrating the internal computer.

With reference now to the figures, and in particular with reference to FIGS. 1 and 2, there is depicted the presentation system 10 of the present invention. Presentation system 10 is generally comprised of an overhead projector (OHP) 12, a liquid crystal display (LCD) panel 14, and an interface or connector card 16 which provides the electrical connections between HP 12 and LCD panel 14. In the preferred embodiment, OHP 12 is a transmissive-type projector, and has all of the features of a conventional overhead projector, including a base 18 and a projection head 20 attached to base 18 by arm 22 (head 20 and arm 22 are omitted from FIG. 1 for simplicity). Conventional adjustment means 24 are used to raise or lower head 20, i.e., move it toward or away from base 18.

Base 18 houses a light source 26, a power supply 28 for light source 26, and appropriate optical components (such as a mirror 30 and fresnel lens 32) for directing, collecting and collimating the light towards a stage 34 (a transparent sheet, e.g., glass). When an image is present on LCD panel 14, or when a transparency is placed on stage 34, the image is collected and projected (to a nearby projection screen or surface) by conventional optics located in head 20. Base 18 also houses a computer 36, discussed below in conjunction with FIG. 3.

LCD panel 14 may also be any conventional liquid crystal display panel, with the exception of the added card edge connector as described further below. Panel 14 may provide gray-scale imaging, simulated color (yellow/blue), or full color, and may be "passive" or "active matrix" (using an array of thin-film transistors), and further may use various types of liquid crystals, preferably supertwisted nematic crystals. Prior art panels are also equipped with their own (conventional) control electronics which convert the video signals from the source (computer) into data which can be transposed to the pixels in panel 14. Additional components may be used to adjust contrast, intensity, color, etc., and allow remote control. Means may also be provided to keep the panel cool, such as cooling systems and/or use of cold filters as disclosed in U.S. Pat. No. 4,763,993. An exemplary LCD panel is sold by the Visual Systems Division of Minnesota Mining and Manufacturing Company (3M—assignee of the present invention) under model number 4180.

Figure 3:
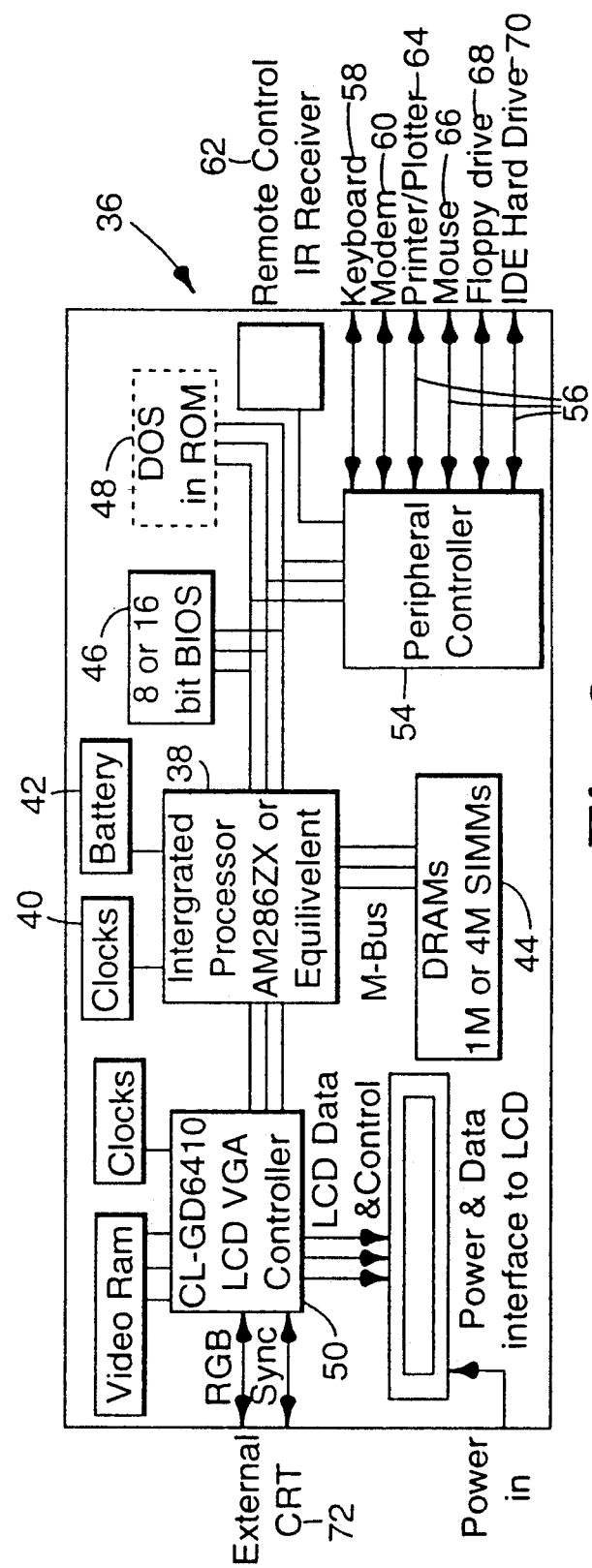
FIG. 3 is a block diagram of the electronic components forming the internal computer in the preferred embodiment of the present invention.

Referring now to FIG. 3, the preferred embodiment of computer 36 is described. Computer 36 includes a microprocessor 38 such as the AM286ZX integrated circuit available from Advanced Micro Devices of Sunnyvale, Calif. Several other conventional components are connected to microprocessor 38, including a clock 40, backup battery 42, dynamic random-access memory (DRAM) 44 for temporary data storage during program execution (preferably at least one megabyte), and read-only memory (ROM) 46 for permanently storing the basic input an output system (BIOS) software. Additional ROM 48 may optionally be provided to store conventional operating system software, including PC-DOS, MS-DOS, OS/2 and MACINTOSH operating systems. Computer 36 may include a plurality of expansion slots (not shown) for receiving circuit boards which add to the computer's functionality. For example, one of the slots could be occupied by a graphics adaptor, such a VGA (visual graphics adaptor) circuit board, providing enhanced graphical output for LCD panel 14. Rather than providing such a card, however, these functions have been integrated, in the preferred embodiment, in the mother board in an LCD/VGA controller 50 such as the CL-GD6410 controller available from Cirrus Logic of Fremont, Calif. This controller can provide output to both an LCD panel and a CRT monitor 72 simultaneously.

LCD panel 14, as well as other peripheral devices, are accessed via a controller 54, having a plurality of output ports 56 (serial and/or parallel) represented in FIG. 3 by double arrows; a satisfactory controller is the PC87310 controller available from National Semiconductor of Santa Clara, Calif. The peripheral devices (besides panel 14) include a keyboard 58, modem 60, remote control 62, printer/plotter 64, mouse (input pointing device) 66, floppy diskette drive 68 and hard disk drive 70. The latter two peripherals (which may be designed for either magnetic or optical media, e.g., CD-ROM) may be located within base 18, although floppy diskette drive 68 is of course externally accessible; although certain of the other peripherals could also be housed within base 18, they are preferably external to reduce space requirements for OHP 12. Most of the peripherals are optional, except that there should be at least one input device (mouse, keyboard or remote control), and there should further be at least one device for data transfer (floppy diskette drive or modem). Several of the peripherals (e.g., modem 60, remote control 62, or mouse 66) may be connected to controller 54 via an RS232 port. A port may also be provided to duplicate the video output to another CRT monitor. Other configurations for computer 36, including additional peripherals, will become apparent to those skilled in the art upon reference to the foregoing description, for example, a personal computer memory card interface adaptor (PCMCIA), an adaptor for a local area network (LAN), or even audio speakers. A port could also be provided for a card reader such as that described in U.S. Pat. No. 4,994,987.

The foregoing design has several advantages, the primary advantage being the spatial efficiencies associated with location of the computer components within base 18 of OHP 12. The integration of the computer and OHP simplifies storage and transportation of presentation system 10, and further protects computer 36 from direct physical damage. There are also efficiencies in manufacture, e.g., it is no longer necessary to provide a separate chassis or housing for computer 36. Moreover, the system setup is simplified since computer 36 is powered by the same power supply 28 which energizes light source 26. In other words, there is no need to provide a separate power connection to computer 36; power to all components is provided via a single electrical cord 74 which is connected to power supply 28 and has a plug at its distal end for connection to an external power source (i.e., conventional 110 AC voltage). It will also be appreciated that only one power outlet is consequently needed. It is also preferable to locate power supply 28 away from computer 36, as shown in FIG. 2, for safety reasons; as a consequence of this placement, certain agency (UL & VDE) manufacturing requirements may also be avoided.

A further novelty in the present invention relates to the connection of computer 36 to LCD panel 14, specifically, the use of connector card 16. By providing compact connection means which is also integrated into the physical design of system 10, the cabling problem associated with prior art systems is avoided. There is no possibility of connecting a cable improperly, of inadvertently disconnecting a cable, or of losing a cable altogether, and use of such a card connection generally increases the reliability of system 10. LCD panel 14 is also easily attached and detached from OHP 12, for example, when transparencies are to be used in lieu of panel 14. Moreover, the use of a connector card which is located proximate stage area 34 gives rise to the unexpected advantage of ensuring that LCD panel 14 is always properly aligned with respect to stage 34. In this regard, it is understood that a slot (not visible in the figures) is positioned on the lower surface of panel 14 at an appropriate location to optimize the alignment of the "window" of LCD panel 14 with stage area 34.

To this end, connector card 16 should be constructed of a rigid material, such as that forming the substrate for most printed circuit boards. Materials include phenolic-resin impregnated paper, acrylic-polyester impregnated random glass mat, epoxy impregnated paper, or epoxy impregnated fiberglass cloth. A plurality of conductive paths (metallic traces) are placed on card 16; the traces lead from the upper edge of the card to the lower edge, and are generally linear, although the traces could have turns or cross-overs as necessary to operatively connect panel 14 to computer 36. Card 16 could also be shielded to minimize interference from ambient electromagnetic signals, and/or keyed to allow insertion into the slot 76 in the upper surface of base 12. So-called "delta" card connectors are both shielded and keyed. It is preferable, however, to design a connector card having symmetric traces in order to avoid the need for polarization and eliminate concern over the insertion of card 16 into slot 76. Card 16 is preferably about 4 cm. long by 2.5 cm wide, with an approximate thickness of 1.5 mm. Of course, card 16 could be permanently fastened to base 16, but it is preferable to allow removal of the card to avoid breakage of the card during use or transportation.

The connection from card 16 is made to panel 14 and computer 36 using conventional card edge connectors 78. Satisfactory connectors are available from 3M's Electronic Products Division, part no. 3462-000. 3M also offers a keyed connector, part no. 3439-2. The number of connections (pins) are variable depending upon the particular LCD panel being used, although a 26-pin connector has been deemed acceptable for most uses. The preferred interconnections are best understood with reference to FIGS. 4A and 4B, to which attention is now directed.

Figure 4A:
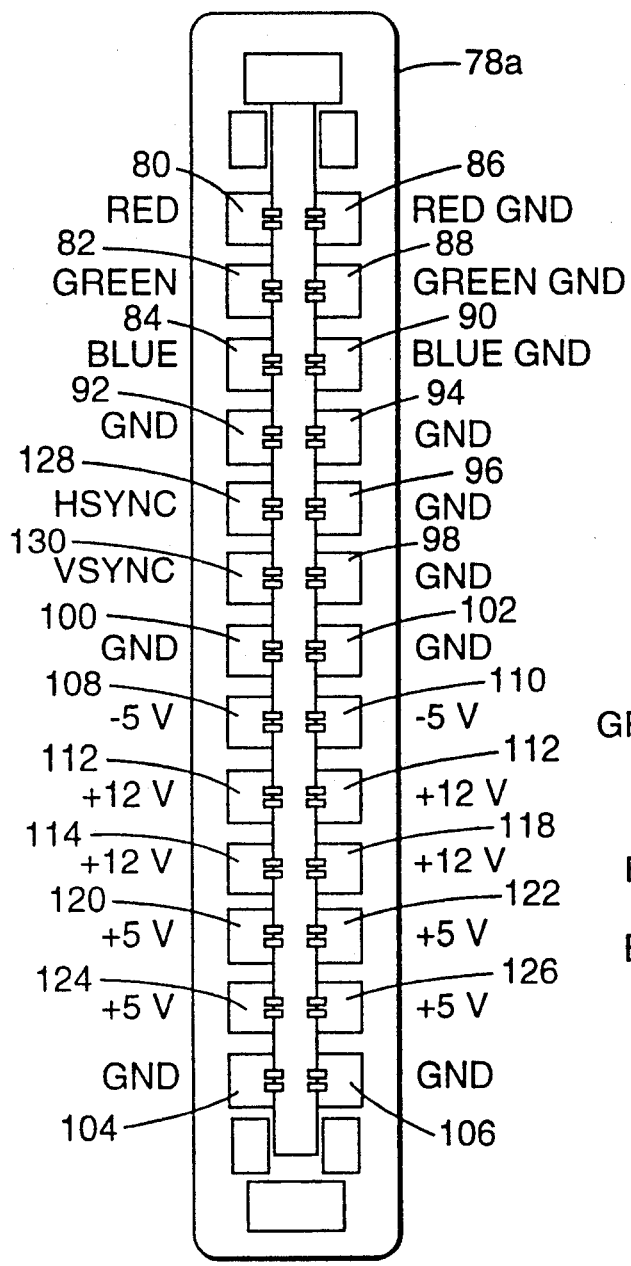
FIGS. 4A and 4B are top plan views of the card connectors used in accordance with the present invention for analog and direct digital drive LCD panels, respectively.

FIG. 4A is a depiction of the connections in an exemplary card edge connector 78a, having 26 terminals, for an LCD panel designed to receive standard computer video output (e.g., VGA), which consists of several analog signals. Terminals 80, 82 and 84 provide connections for the signals corresponding to the primary colors, viz., red, green and blue, respectively. Terminals 86, 88 and 90 are the grounds for these respective signals. Additional grounding terminals are provided at 92, 94, 96, 98, 100, 102, 104 and 106. Power is provided at terminals 108 (−5 volts), 110 (−5 v), 112 (+12 V), 114 (+12 V), 116 (+12 v), 118 (+12 v), 120 (+5 v), 122 (+5 v), 124 (+5 v) and 126 (+5 V). Horizontal and vertical synchronous control signals are provided via terminals 128 and 130, respectively.

Figure 4B:
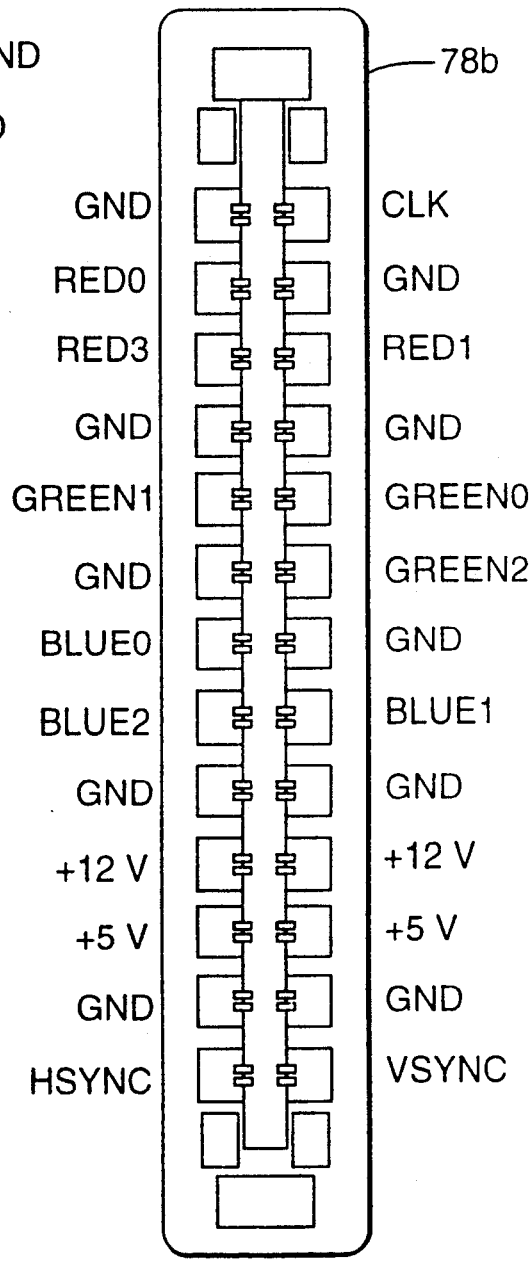

FIG. 4B is similar to FIG. 4A, except that the card edge connector 78b of FIG. 4B is designed for LCD panels which are driven with direct digital signals.

Figure 5:
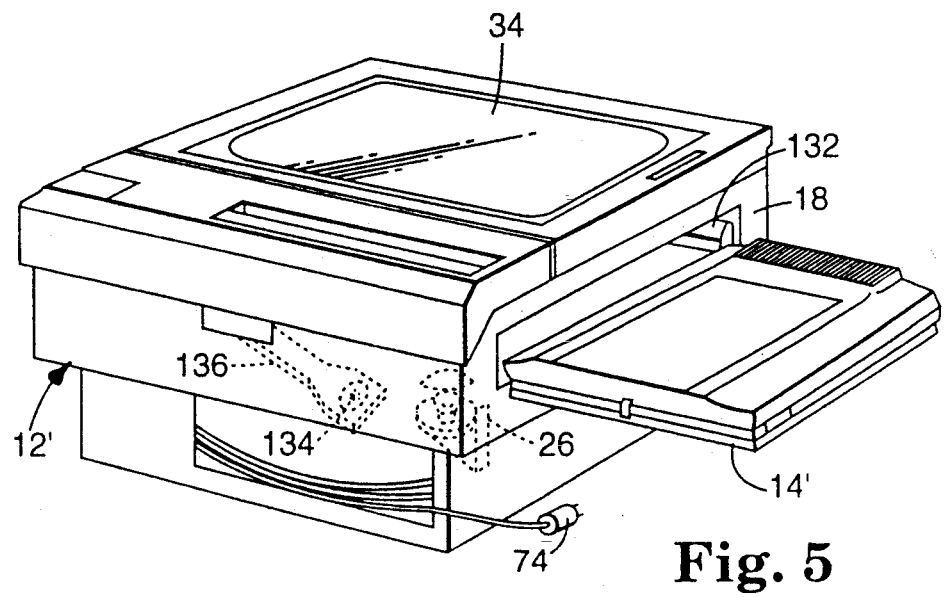
FIG. 5 is a perspective view of another embodiment of the OHP/LCD system of the present invention, wherein the LCD panel slides out from the OHP base.
Figure 6:
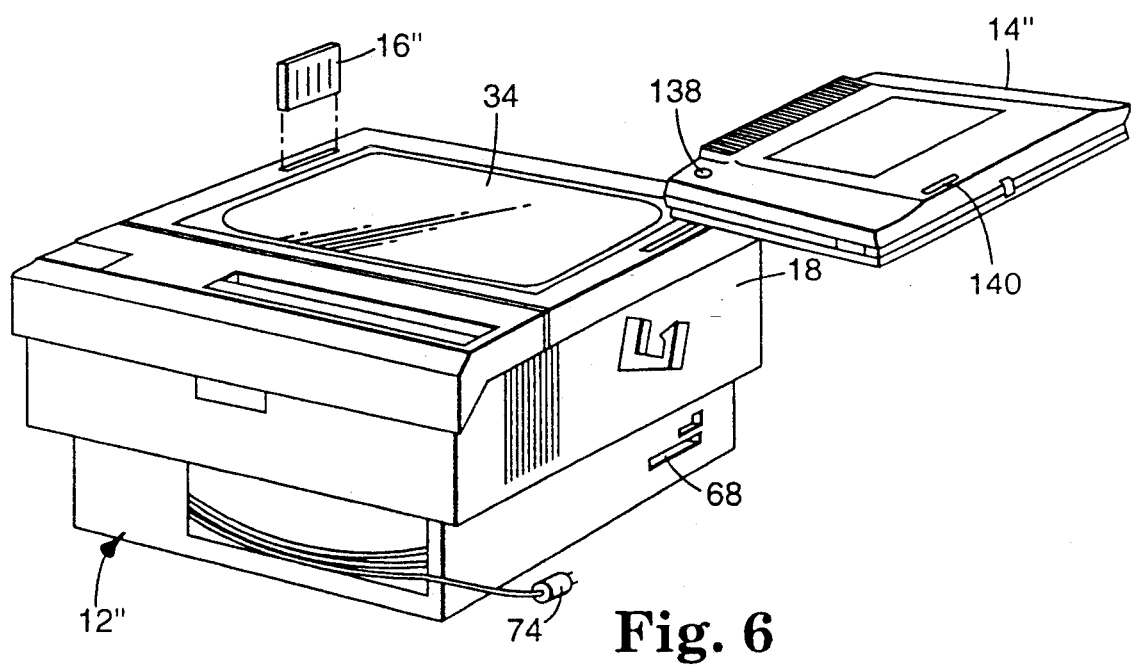
FIG. 6 is a perspective view of yet another embodiment of the OHP/LCD system of the present invention, wherein the LCD panel swings away from the OHP stage.

FIGS. 5 and 6 illustrate alternative embodiments of the OHP/LCD system of the present invention which are the subject of this continuation-in-part application. FIG. 5 depicts the embodiment wherein the LCD panel 14' slides into the side of base 18' of OHP 12'. The sliding movement may be achieved by any convenient means, such as by making panel 14' into a drawer by attaching thereto rollers or splines which engage tracks 132 inside base 18' (or vice-versa). More preferably, however, OHP 12' is provided with a conventional drawer which can removably receive panel 14'. In this manner, panel 14' may be completely removed from the OHP/LCD system and used in other presentation or display systems. OHP 12' may be constructed to accommodate insertion of panel 14' in any of the four sides of base 18'; however, it preferably is inserted into the left or right side. In some OHP's, the projection head 20 may be lowered for storage or transportation by pivoting arm 22 downward, where it often rests alongside of base 18'. In such a case, panel 14' would be inserted on the side opposite arm 22.

The embodiment of FIG. 5 preferably takes advantage of the benefits associated with connector card 16. In this embodiment, however, card 16 is permanently attached to the inside of base 18', and the slot in panel 14' for receiving card 16 is located in the side of the panel, i.e., the card is horizontal (parallel to stage 34), as opposed to the vertical orientation of FIG. 1. The slot in panel 14' may have a slightly flared entrance to facilitate insertion of the card. Stop pads (not shown) may be provided inside base 18' to minimize damage if the panel is inserted into the base with excess force. Means may be provided to signal to the user that the panel has been properly inserted, e.g., a plastic tine may register with an indentation in panel 14' to provide an audible click when the panel is fully inserted. A cover may also be provided for the drawer to protect the panel; for example, a tambour which rolls up inside base 18' would come out when the drawer is pulled, and be spring loaded so that it automatically retracts.

When panel 14' is inserted in base 18', some light from lamp 26 is wasted since the optics are designed to fully illuminate the area defined by stage 34, but the window of panel 14' is typically smaller than stage 34, and this window is now closer to lamp 26 and the condenser lens. To optimize the amount of light striking the window of panel 14', an auxiliary lens 134 may be used. Any convenient means may be used to flip auxiliary lens 134 into and out of the optical path when panel 14' is inserted or removed from base 18'. For example, auxiliary lens 134 may be held by a lever 136 which is actuated by a simple linkage as panel 14' is inserted into the OHP. Biasing means (such as a spring) would retract lever 134 when the panel is removed. Auxiliary lens 134 is designed to focus the light more narrowly at the window of panel 14', so its specific design details depend upon the size and location of the window, as well as the optical design of the primary condenser lens.

Those skilled in the art will also appreciate that the system of FIG. 5 may eliminate certain components of the OHP/LCD system, specifically, a pair of Fresnel lenses. LCD panels typically require two such lenses, one at the bottom of the LCD stack and the other at the top of the stack. The lower Fresnel lens serves to collimate the light passing through the panel, while the upper Fresnel lens duplicates the purpose of Fresnel lens 32, viz., to condense the light/image toward projection head 20. Rather than placing these lenses in the LCD stack, they can be permanently located in the OHP, with a sufficient vertical spacing to allow insertion of panel 14' between the Fresnel pair. Provision of both Fresnel lenses in the OHP does not affect its performance when panel 14' is not in use. Placement of the panel in such a drawer would also eliminate the need for expensive tooling costs of the molded, polymeric cover provided on most panels.

Referring now to FIG. 6, another embodiment of the OHP/LCD system of the present invention is shown in which the LCD panel 14" is pivotally attached to OHP 12". In this exemplary embodiment, panel 14" is attached by means of a post or peg 138 which is removably inserted into a hole in the top of base 18". Peg 138 may itself be removable from panel 14" so that the panel may be used in other systems without mechanical interference from the peg. A reinforcing bar might be integrally formed with peg 138 to provide further support along the bottom of the panel. Since the panel is designed to swing in a horizontal motion, it is preferable to provide a slot 140 which passes completely through panel 14", to allow insertion of card 16" after the panel is moved to its operative position. Consequently, card 16" is slightly longer than the card 16 of FIG. 1. It is also understood that panel 14" could pivotally swing into the interior of base 18", rather than on top of stage 34, in a manner similar to FIG. 5, although this would require a slightly larger opening in the side of base 18" to accommodate the diagonal length of panel 14".

Several benefits are realized as a result of horizontally swinging the panel into place, in both embodiments of FIGS. 5 and 6. First of all, when the LCD panel is not to be used, it is easily removed from optical path to allow conventional usage of the OHP with transparencies, but the panel need not be completely removed, and so the user is not concerned with temporary storage of the panel. Nevertheless, the panel may be completely removed from the OHP for use with other systems. Also, when the panel is not in use, it does not present an obstruction to viewers of the projection screen, and it can be used as a shelf to support other articles, e.g., transparencies and pens. Finally, these systems still take advantage of the connector card to eliminate cabling difficulties.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, those skilled in the art will appreciate that the present invention may also be applied to reflective-type overhead projectors and reflective-type LCD panels. It is therefore contemplated that such modifications can be made without departing from the spirit or scope of the present invention as defined in the appended claims.

We claim:

1. An apparatus for electronically generating an image in a light-transmissive display panel and for projecting the image, the apparatus comprising:
   a light source;
   means for housing said light source, said housing means having a transparent stage area;
   optical means attached to said housing means, proximate said stage area, for collecting and projecting light which passes through said stage area;
   drawer means located in said housing means for slidably moving the display panel between said light source and said stage area;
   computer means located in said housing means for electronically storing the image; and
   means for electrically connecting said computer means to the display panel, including a generally planar card member having at least one surface, there being a plurality of electrically conductive paths located on said surface.

2. The apparatus of claim 1 wherein said computer means has a plurality of output ports for connecting said computer means to external peripheral devices.

3. The apparatus of claim 1 further comprising auxiliary lens means for focusing light from said light source toward the display panel when the panel is located between said light source and said stage area.

4. The apparatus of claim 1 wherein said computer means includes:
   a microprocessor;
   permanent memory means, connected to said microprocessor, for storing program instructions for said microprocessor;
   temporary memory means, connected to said microprocessor, for electronically storing the image;
   graphic adaptor means, connected to said microprocessor, for generating a video signal corresponding to the electronically stored image; and
   means, connected to said microprocessor, for controlling the peripheral devices.

5. The apparatus of claim 1 further comprising a liquid crystal display panel removably attached to said drawer means, said liquid crystal display panel including a card-edge connector having a plurality of electrical contacts for connection to said electrically conductive paths on said connector card.

6. The apparatus of claim 2 further comprising an external video monitor electrically connected to one of said output ports for remote viewing of the image.

7. The apparatus of claim 3 further comprising means for moving said auxiliary lens means to an operative position as the display panel is moved between said light source and said stage area.

8. The apparatus of claim 4 further comprising disk drive means located in said housing means and electrically connected to said microprocessor, for receiving an external diskette having data stored thereon.

9. An apparatus for electronically generating an image in a light-transmissive display panel and for projecting the image, the apparatus comprising:
   a light source;
   means for housing said light source, said housing means having a transparent stage area;
   optical means attached to said housing means, proximate said stage area, for collecting and projecting light which passes through said stage area;
   means attached to said housing means, proximate said stage area, for pivotally moving the display panel adjacent said stage area;
   computer means located in said housing means for electronically storing the image; and
   means for electrically connecting said computer means to the display panel, including a generally planar card member having at least one surface, there being a plurality of electrically conductive paths located on said surface.

10. The apparatus of claim 9 wherein said computer means has a plurality of output ports for connecting said computer means to external peripheral devices.

11. The apparatus of claim 9 wherein:
    said card member is generally rectangular, having first and second edges;
    said conductive paths on said member are generally linear, extending from said first edge to said second edge, defining first terminals located at said first edge and second terminals located at said second edge; and
    said housing means has an upper surface coinciding with said stage area, and a card-edge connector having a slot located at said upper surface, said card-edge connector being electrically connected to said computer means and having a plurality of electrical contacts for connection to said first terminals of said conductive paths on said connector card.

12. The apparatus of claim 9 wherein said computer means includes:
    a microprocessor;
    permanent memory means, connected to said microprocessor, for storing program instructions for said microprocessor;
    temporary memory means, connected to said microprocessor, for electronically storing the image;
    graphic adaptor means, connected to said microprocessor, for generating a video signal corresponding to the electronically stored image; and
    means, connected to said microprocessor, for controlling the peripheral devices.

13. The apparatus of claim 9 wherein:
    said housing means has an upper surface coinciding with said stage area; and
    said means for pivotally moving the display panel comprises a peg member attached to the display panel, said peg member being removably received in a hole formed in said upper surface of said housing means.

14. The apparatus of claim 10 further comprising an external video monitor electrically connected to one of said output ports for remote viewing of the image.

15. The apparatus of claim 11 wherein the display panel comprises a liquid crystal display panel having another card-edge connector with a plurality of electrical contacts for connection to said second terminals of said conductive paths on said connector card.

16. The apparatus of claim 12 further comprising disk drive means located in said housing means and electrically connected to said microprocessor, for receiving an external diskette having data stored thereon.

17. A presentation system comprising:

a base having an upper surface, said upper surface having a stage area defined by a transparent sheet;

a light source located in said base;

optical means attached to said base, proximate said stage area, for collecting and projecting light which passes through said stage area;

a light transmissive display panel; and means for removably attaching said display panel to said base, said attaching means comprising a drawer attached to an interior portion of said base, said drawer being slidably movable between an operative position and a storage position, and being sized to support and receive said display panel.

18. The presentation system of claim 17 further comprising:

computer means located in said base for electronically storing an image and transmitting it to said display panel; and card means for electronically connecting said computer means to said display panel and for aligning said display panel with said stage area.

19. A presentation system comprising:

a base having an upper surface, said upper surface having a generally rectangular stage area defining four corners, and said base having a hole therein at one of said corners;

a light source located in said base;

optical means attached to said base, proximate said stage area, for collecting and projecting light which passes through said stage area;

a light transmissive display panel having four corners; and means for removable attaching said display panel to said base, said attaching means allowing said display panel to be moved between operative and storage positions, and comprising a post member removably fastened to one of said corners of said display panel, said post member being sized to fit in said hole in said base.

* * * * *